Jan. 30, 1951 F. HUNTAR 2,539,425
OVERLOAD RELEASE DRIVE CLUTCH
Filed Oct. 28, 1946 4 Sheets-Sheet 3

INVENTOR
Felix Huntar
BY Ivan D. Thornburgh
Charles H. Cane
ATTORNEYS

Jan. 30, 1951　　　　　　　　F. HUNTAR　　　　　　　2,539,425
OVERLOAD RELEASE DRIVE CLUTCH
Filed Oct. 28, 1946　　　　　　　　　　　　　　4 Sheets-Sheet 4
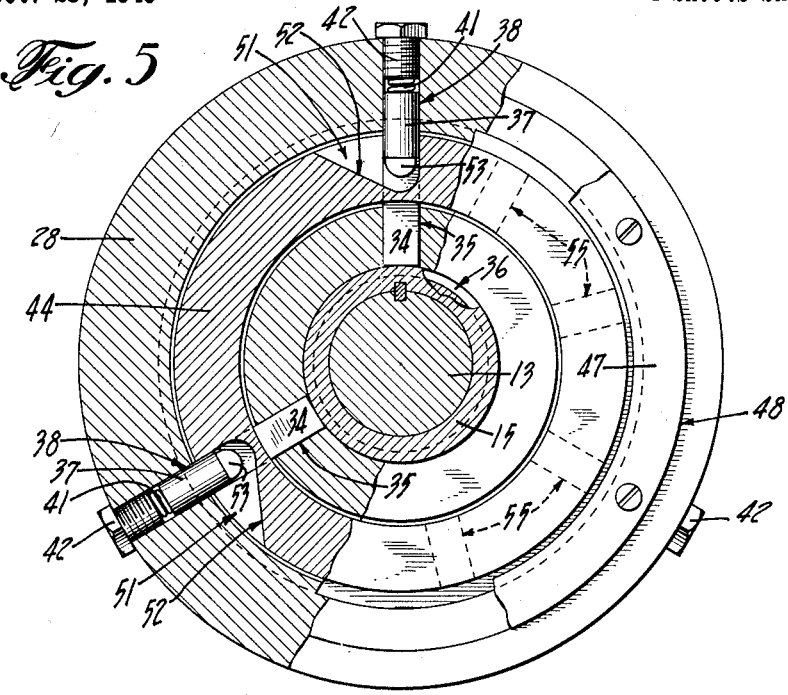
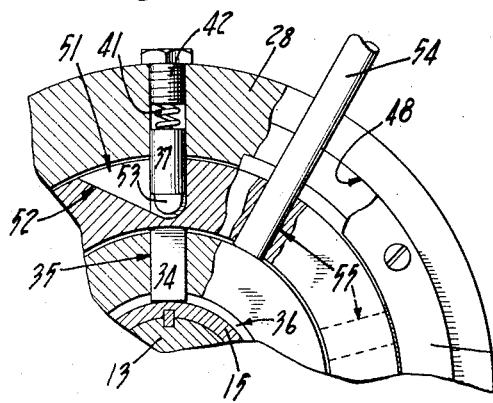
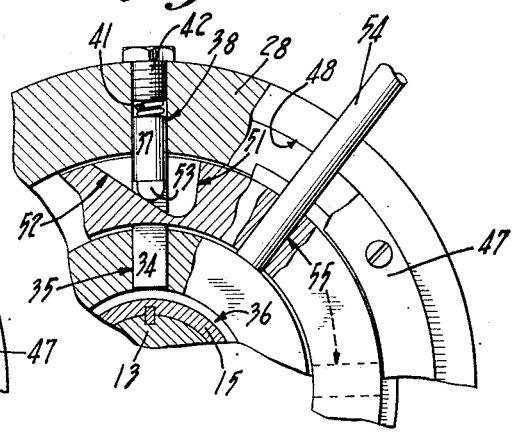
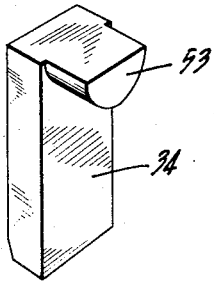
INVENTOR
Felix Huntar
BY Ivan D. Thornburgh
Charles H. Erne
ATTORNEYS Patented Jan. 30, 1951

2,539,425

UNITED STATES PATENT OFFICE 2,539,425

OVERLOAD RELEASE DRIVE CLUTCH

Felix Huntar, Livingston, N. J., assignor to American Can Company, New York, N. Y., a corporation of New Jersey Application October 28, 1946, Serial No. 706,141

9 Claims. (Cl. 192—56)

This invention relates to a driving clutch mechanism and has particular reference to a slip clutch which is disposed between two connected machines or different parts of a machine operating in synchronism on different cycles, and which upon disengagement may be reset easily to reestablish the proper timed relation between the machines or machine parts before again setting them in operation.

In the operation or driving of machines or different parts of a single machine, slip clutches usually are employed for stopping the different machines or parts thereof during an abnormal condition arising in one machine or in one section of the machine. In machines operating on a single cycle, the clutch parts may be reengaged through a single revolution and the parts returned to their original timed relation.

In connected machines which operate at different speeds or cycles of operation, as for example, at a ratio of 4 to 1 or any ratio different than 1 to 1, the reengagement or resetting of the clutch parts must correspond with the proper timed relation of the machines, otherwise the clutch would reconnect the machines with the machines out of time. Hence serious damage to the machines would result when they were set in operation.

The present invention contemplates a double slip clutch which is located between different machines, units or parts thereof which operate at different speeds or cycles in timed relation and which is arranged with a driving disk and a plurality of cooperating synchronized driven disks, the latter upon disengagement of the clutch parts due to abnormal conditions, being rotatable relative to each other through a differential device for resetting the clutch and the portions of the machines connected therewith in a predetermined timed relation.

An object of the invention is the provision in connected machines, or parts thereof of a slip clutch mechanism wherein the clutch mechanism is adapted to control the operation of the machines, or parts thereof when they operate at different speeds or cycles, i. e., at ratios different than one to one.

Another object is the provision of such a slip clutch mechanism wherein the clutch mechanism, after disengagement due to an abnormal condition in the machine, can be reset for effective operation only upon reestablishment of the proper timed relation between the machines or parts thereof.

Another object is the provision of such a slip clutch mechanism wherein the reestablishment of the proper timed relation between the machines or parts thereof automatically resets the clutch mechanism for continued operation of the machines.

Another object is the provision of such a slip clutch mechanism wherein double synchronized driven members movable relative to each other are utilized in the clutch mechanism for reestablishing and maintaining proper timed relation between the clutch and the machines or parts of a machine which the clutch controls.

Another object is the provision of such a slip clutch mechanism wherein the parts of the clutch upon disengagement are locked against reengagement until a proper timed relation has been effected between the clutch parts.

Numerous other objects and advantages of the invention will be apparent as it is better understood from the following description, which, taken in connection with the accompanying drawings, discloses a preferred embodiment thereof.

Referring to the drawings:

Fig. 5 is an end view of the mechanism shown in Figs. 1 and 2, drawn to a reduced scale (as viewed from the right), with parts broken away, parts in section and showing the relative position of the locking keys;

Fig. 6 is a fragmentary view showing some of the parts illustrated in Fig. 5 with a bar in an inserted position preparatory to releasing the locked keys;

Fig. 7 is a view similar to Fig. 6 showing the bar and certain clutch parts shifted into a different position for releasing the locking keys; and Fig. 8 is a perspective view, drawn to an enlarged scale, showing the details of a locking key.

Figure 1:
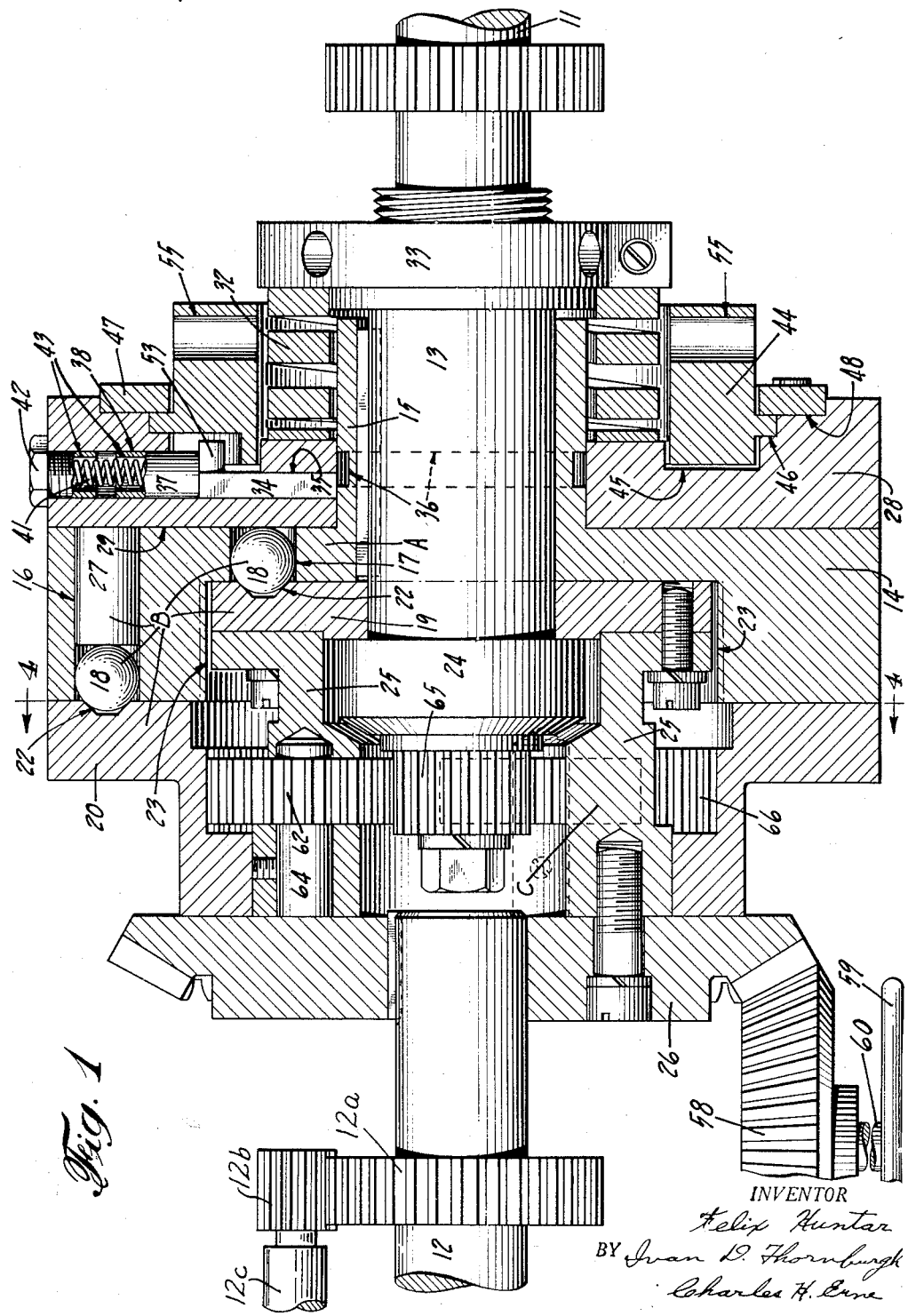
Figure 1 is a longitudinal sectional view of a driving clutch mechanism embodying the present invention showing the parts in operating position.

As a preferred embodiment of the invention the drawings illustrate a driving clutch mechanism which may be mounted as a single unit on the ends of two connecting shafts of two adjacent machines, devices or parts of a single machine. One of the shafts constitutes a drive shaft 11 and the other a driven shaft 12. Shafts 11 and 12 normally operate at the same speed through the instant clutch mechanism.

The driven shaft 12 (Fig. 1) may carry a gear 12a which meshes with a pinion 12b. Since a ratio of four to one is selected for purposes of illustration, pinion 12b will be one fourth the diameter of the gear 12a. Pinion 12b is mounted on a shaft 12c which thus will be considered the key shaft on which a given set of operations depends.

In other words, four revolutions of shaft 12c completes the desired cycle of operations. Therefore, drive shaft 11 and driven shaft 12, when operating together under normal driving conditions, will make one revolution for the desired cycle of four revolutions of the key shaft 12c.

An abnormal condition which blocks either shaft will disrupt the normal connection between shafts 11 and 12. The interposed clutch mechanism of the present invention will allow a change of relative shaft positions without damage. This relative change creates an abnormal relation between shafts. Resetting is done through shaft 12, which may have to be rotated a maximum of nearly four revolutions with drive shaft 11 stationary, before it is again properly related to the drive shaft.

The present clutch mechanism insures proper setting and prevents establishment of any shaft relations, except that relation which will give the desired cycle of operation as to the key shaft 12c.

In the event that the driven shaft 12 is forced out of its predetermined position with respect to the drive shaft 11 due to an abnormal condition arising in one of the machines or part thereof, provision is made for restoring the proper timed relation by turning certain of the clutch parts, while other parts are held stationary, thereby reestablishing the proper cycle of operations in the respective machines or parts thereof.

Figure 2:
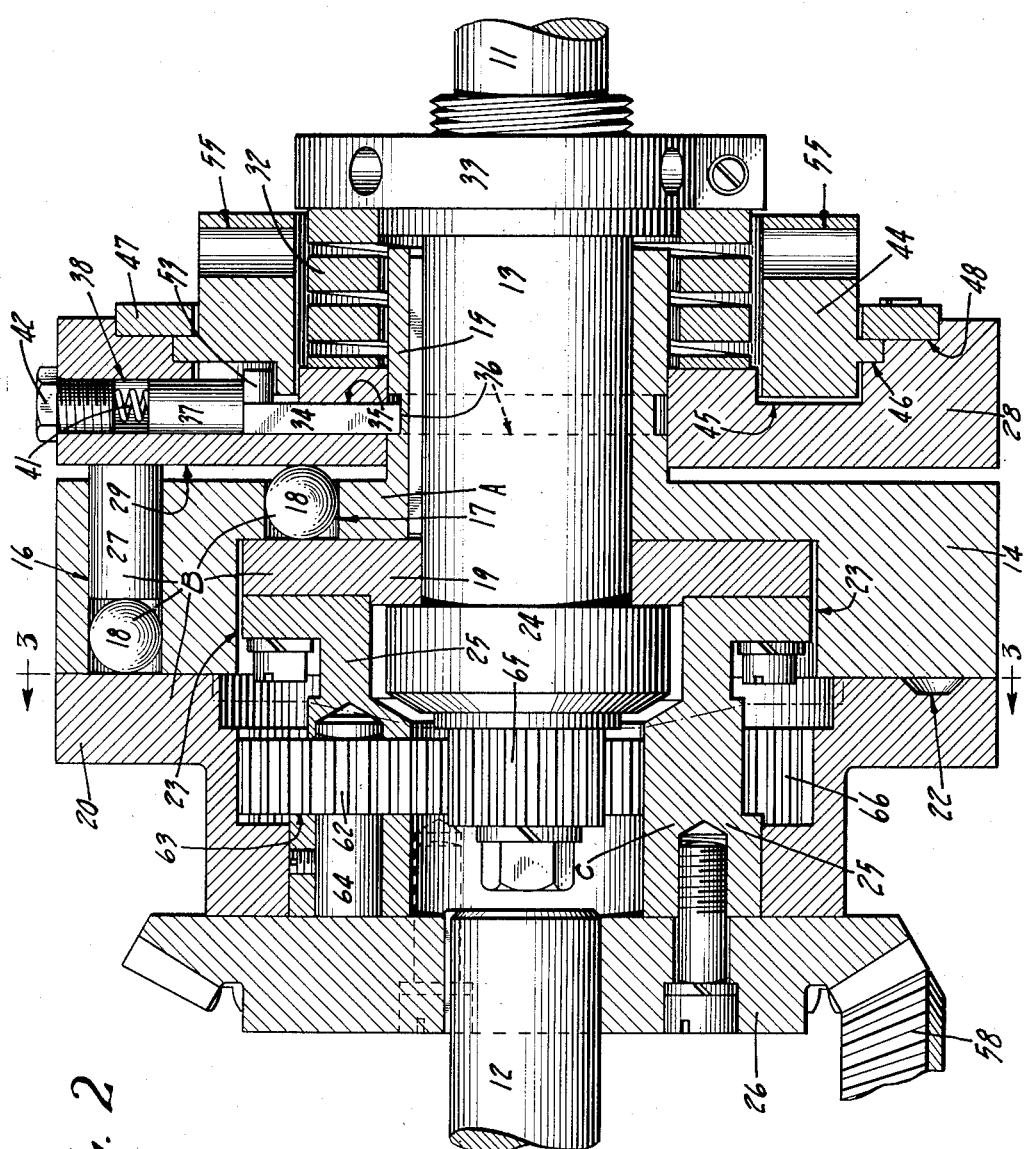
Fig. 2 is a view similar to Fig. 1 showing the clutch parts separated with a locking key holding them in an inoperative position.
Figure 3:
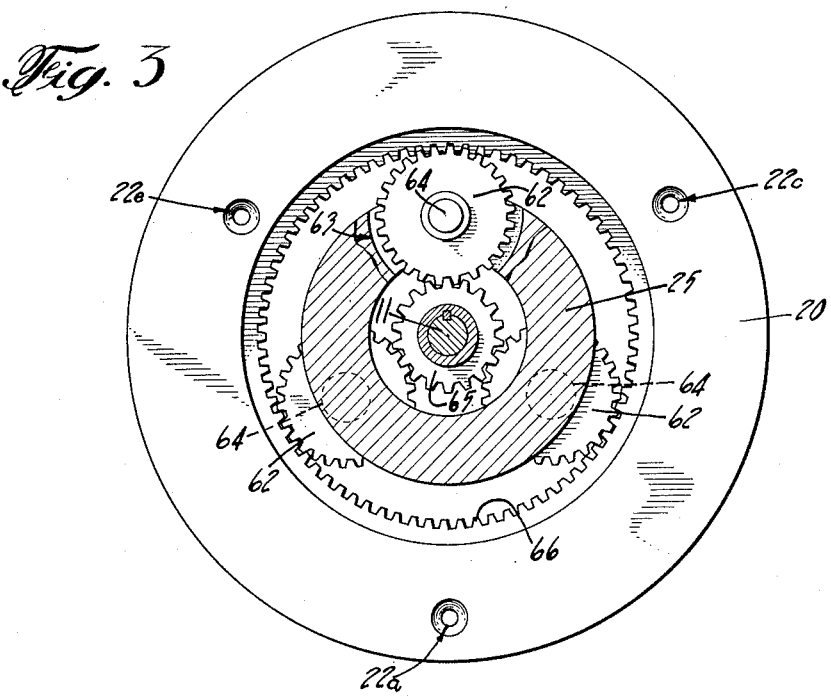
Fig. 3 is a transverse sectional view taken along the broken lines 3—3 in Fig. 2, drawn to a reduced scale, showing a gear drive for resetting the clutch parts.

The shaft 11 has a shaft extension 13 which may be formed as an integral part or may be secured as a separate part on the inner end of the shaft (Figs. 1 and 2). Shaft extension 13 carries the driving parts of the clutch mechanism and these are referred to as a driving member A. Driving member A is connected through clutch driving instrumentalities B to a driven member C which is mounted to operate with the driven shaft 12.

Drive member A comprises a driving body 14, formed with a bearing 15 which is keyed onto the shaft extension 13. Driving body 14 is provided with a plurality of outer holes 16, and a plurality of inner holes 17. There are three of each of the holes 16, 17. Outer holes 16 are preferably equally spaced one from another at an angular distance of 120 degrees, their radial lines passing through the center of the body 14 and through the center of the shaft extension 13. These outer holes 16, each of which is disposed at a different distance or radius from the center, will be referred to as inside, intermediate and outside, outer holes in accordance with each distance from the center.

The inner holes 17 are also equally spaced around the shaft center and are located at different distances or radii from the center. These three inner holes 17 may be logically referred to as inside, intermediate and outside, inner holes, in accordance with each distance from the center. The outside outer hole 16 is on the same radial line as the outside inner hole 17. The intermediate outer and inner holes are likewise radially aligned, as are also the inside outer and inner holes. This permits what may be termed a selective registration of the clutch parts, as will be further explained.

The clutch instrumentalities B comprise clutch elements or balls 18 which engage with disk elements 19, 20 (Figs. 1, 2, 3 and 4). The clutch balls 18 are carried in the holes 16, 17 and engage in countersunk recesses or sockets 22, formed in alignment therewith, in the faces of the disk elements 19, 20.

The balls 18 in the inner holes 17 which seat in sockets formed in the face of the disk element 19, may be considered primary clutch parts. The balls in the outer holes 16 which seat in sockets formed in the face of the disk element 20 logically constitute secondary clutch parts.

Figure 4:
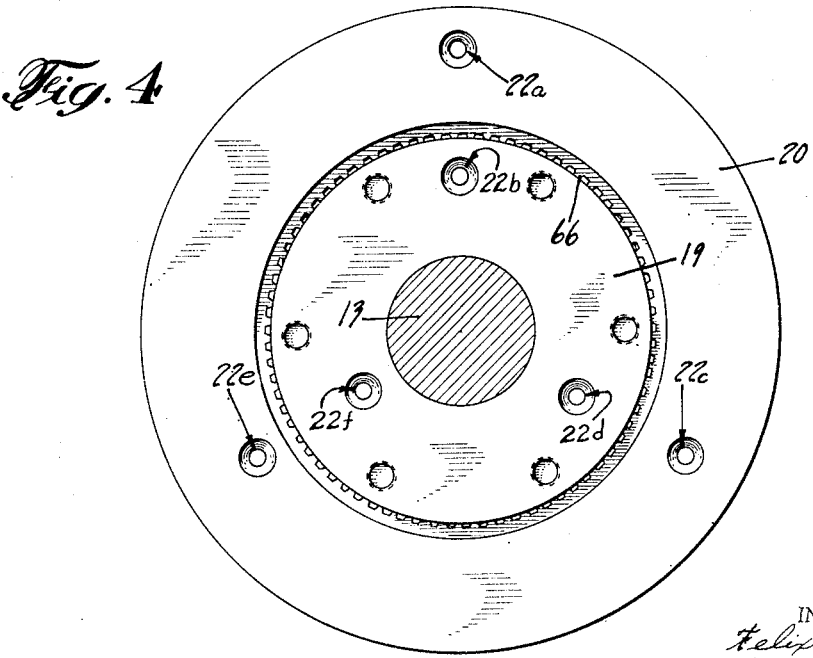
Fig. 4 is a transverse view taken along the lines 4—4 in Fig. 1, drawn to a reduced scale, showing disk faces and countersunk openings formed therein for receiving the clutch balls.

Fig. 4 shows these recesses or sockets 22 in their normal relations, that is, when the disk elements 19 and 20 are in their normal clutch driving positions. These recesses may be designated in the same terminology as used for the holes 16 and 17. When so expressed, Fig. 4 shows outside, outer and inner recesses 22a and 22b of the respective disks 20 and 19 as being on the same radial line passing through the center of the shaft extension 13.

In like manner the intermediate, outer and inner recesses, of disks 20 and 19, marked 22c and 22d, are aligned. The same also holds for the inside, outer and inner recesses, marked 22e and 22f. It is this radial alignment of outer and inner recesses of the elements 20 and 19 that constitute the selective clutch positioning mentioned above. This is the proper angular setting between the shafts 11 and 12 for rotation together in normal operation.

The disk element 19 is located in a counterbore 23 of the driving body 14 and is rotatably carried on the shaft extension 13. Disk element 19 frictionally bears under the driving load of the clutch against a flange 24 formed on the inner end of the shaft extension 13. The disk element is secured to the inner end of a hub 25 which surrounds the flange 24. The hub 25 is secured at its outer end to a bevel gear 26 mounted on the driven shaft 12.

The disk element 20 is freely carried on the hub 25 and preferably is spaced from the disk element 19. Spacer pins 27 are slidably carried in the holes 16 and engage against the outer row of balls 18 and thus are included as part of the clutch instrumentalities B.

Driving member A includes a pressure plate 28 which is carried on the bearing 15. The pressure plate 28 has an inner face 29 which frictionally engages the inner balls 18 and the pins 27 which in turn frictionally engage the outer balls 18 for keeping the two sets of instrumentalities B in driving engagement (Fig 1). In order to maintain the pressure plate 28 in driving position, a spring 32 is provided which surrounds the bearing 15 and which is interposed between the pressure plate and a locking nut 33. The locking nut 33 is adjustably mounted on the shaft 11 by means of which a predetermined yielding pressure may be set up against the plate 28 through the spring 32 and effective for different clutch driving conditions (see also Fig. 2).

During normal driving operations the clutch parts are in the position illustrated in Fig. 1. Should an abnormal condition arise such as a jam in the machine that is being driven, the shaft 12 stops rotating while the driving shaft 11 continues to rotate temporarily. This stoppage of driven shaft 12 and the gear 26, hub 25, and disk element 19 connected therewith, forces both inner and outer balls 18 out of their sockets 22. The displaced balls push the pressure plate 28 outwardly against the resistance of the spring 32. Thus the clutch instrumentalities B become disengaged. The outward travel of the pressure plate is utilized for actuating an electric switch or other trip device, not shown, which is a usual component part of slip clutches and this switch or device acting upon the source of power of the machine stops the rotation of the drive shaft 11 to render the entire machine inoperative so that the abnormal condition may be remedied.

Since it is almost impossible to stop the rotation of the drive shaft 11 simultaneously with the stoppage of the driven shaft 12, an unpredictable amount of overthrow of the drive shaft takes place and this throws the driving member A and the driven member C out of their proper timed relation. During this overthrow movement of the shaft 11, the outer balls 18 are rotating along the adjacent face of the disk element 20 and the inner balls along the adjacent face of the disk element 19. Since all of the balls were forced out of their sockets at the time the shaft 12 stopped, all of the balls at that time combine to hold the pressure plate so that the spring 32 is compressed momentarily, as will be further described.

A complete overthrow revolution of the driving body 14 alongside of the now stationary disk element 19, carries the inner balls 18 into alignment with their sockets 22b, 22d and 22f, see Fig. 4, but the disk element 20 is turning at a different rate of rotation of the driving body 14 so that the sockets 22a, 22c and 22e of the disk 20 are not aligned with the outer balls 18. Under these conditions the outer balls will prevent seating of the clutch parts. In like manner, a complete overthrow revolution as to the disk element 20 would carry the outer balls 18 into alignment with their sockets, but the inner balls will prevent seating of the clutch parts. One set of aligned balls, even though the balls might drop into their sockets, there being no spring pressure to hold them in their seats, is not sufficient to operate the engaged parts.

To relieve the pressure of the balls against the engaged faces of the disk elements 20 and 19, provision is made to hold the displaced pressure plate 28 in its forced-out position against the resistance of the spring 32, so that the pressure will be taken off the balls 18 while the drive shaft is brought to a full stop. This holding of the pressure plate in an inoperative position is brought about through the action of a plurality of flat locking keys 34 which are rectangular in cross-section (Fig. 8).

There are three keys 34 and they are carried in key slots 35 formed in the pressure plate 28. The inner ends of the keys 34 engage in an annular groove 36 formed in the bearing 15. The keys 34 are moved radially inward by pressure devices or spring actuated plungers 37 which are carried in bores 38 in the pressure plate 28. The plungers 37 (Fig. 1) are backed up by compression springs 41 which are retained in place by hollowed screws 42 threadedly secured in the pressure plate 28. Plungers 37 like the hollow screws 42, are formed with recesses within which the ends of the springs 41 are located.

In order to restore the clutch parts to their proper timed relation, the locking keys 34 must be withdrawn from the annular groove 36. This is done while the driving parts are held stationary and while the driven parts are rotated to reestablish the proper timed relation therebetween. For this purpose a key release ring 44 is provided for camming out and releasing the locking keys (Figs. 1 and 2). The key release ring 44 normally is rotatable with the pressure plate 28 but is movable relative thereto while resetting the clutch parts. The ring 44 is carried in annular grooves 45, 46 in the pressure plate 28 and is held therein by a retaining ring 47 located and secured in a face groove 48 (see also Figs. 2, 5, 6 and 7).

The key release ring 44 is provided with three pockets 51, one for each of the locking keys (Fig. 5). The pockets 51 are each formed with a cam wall 52 which is engageable by a semicircular extension 53 formed on one face of each of the keys 34 (see also Fig. 8) for withdrawing the keys out of the annular slot 36 to release them from their locked position upon rotation of the release ring 44. This action allows the spring 32 to re-exert or restore its effective pressure against the pressure plate 28 and the clutch instrumentalities B preparatory to resetting the clutch parts in proper timed relation.

Rotation of the key release ring 44 relative to the pressure plate 28 is effected manually by a bar or other suitable tool 54 which is inserted into any one of a series of holes 55 formed in the key release ring 44. Following the insertion of the bar 54 and the movement of the ring 44 to release the locking keys, the bar may be held to keep the driving members from turning while the driven member C is rotated relative thereto.

Turning of the driven member C is effected manually by a bevel gear 58 which meshes with and rotates the bevel gear 26. Bevel gear 58 may be rotated in any suitable manner, as for example, by a hand wheel 59 connected to the bevel gear 58 through a shaft 60. The rotating action effects the turning of the hub 25 and the disk element 19 relative to the driving body 14 and the balls 18 in the openings 17.

The hub 25 (Figs. 1, 2 and 3) carries a plurality of spaced apart intermediate gears 62, arranged in a circle concentric with the driven shaft 12 and located in clearance openings 63 formed in the hub. There are three of these gears and they form part of a differential gear drive unit which effects the relative movement of the disk elements 19, 20 for reestablishing a proper timed relation of the respective sockets 22 with the clutch balls 18. The gears 62 are carried on pins 64 which are secured in the hub 25 in any suitable manner.

The intermediate gears 62 surround and mesh with a gear 65 secured to the inner end of the driving shaft 11. The intermediate gears 62 also mesh with internal gear teeth 66 formed in the disk element 20. Thus, as the hub 25 is turned to rotate the disk element 19, the disk element 20 also is rotated relative thereto but at a different speed of travel. If the ratio of the driven machine to that of the driving machine is four to one, which is the arbitrary ratio selected to illustrate the present invention, the gearing required between the disk elements is such that for every four revolutions of the disk element 19, the disk element 20 will make five turns. Whatever this ratio may be, the two disk elements 19, 20 will be brought into proper timed relation only when their ball sockets 22 are brought into such relative positions as to permit the balls 18 to snap back into the sockets of both disk elements at the same time. When this takes place, the timed relation of the disks has been reestablished and the clutch mechanism is thus reset and is again ready for starting of the machine. Before starting the machine, the holding bar 54 is removed from the key release ring 44.

During normal operations of the engaged clutch, the driving and driven parts operate at the same speed, thus the meshing gears 62, 65 and 66 remain stationary relative to each other.

A step by step description of the resetting of the clutch mechanism under a particular set of circumstances will now be given by way of further example. It will be assumed that the overthrow of the drive shaft 11, after stoppage of the driven shaft, has carried the driving body 14 with its outer and inner balls 18 one and a half turns relative to the disk element 19. The disk element 20, during this overthrow, has rotated in the opposite direction ⅜ revolution. This is by reason of the one to four ratio between gear 65 and gear teeth 66. None of the balls 18, therefore, are on the same radial lines of their several sockets.

To restore a proper setting to the clutch mechanism, the locking keys 34 first are released as previously stated, and pressure of the spring 32 is made effective through the pressure plate 28 on the balls 18. Then the handwheel 59 is rotated and through the gear 50, this turns the driven parts which are the gear 26, hub 25 and disk 19. The shaft 11, the gear 65 and the driving body 14, including the balls 18, are now stationary.

Since the set of operations dependent on the key shaft 12c in most cases will follow in a given sequence, the parts will not be turned back in setting but will be turned forward as to the overthrow relation. The disk element 19 and hub 25 carry the shafts 64 in a circle and the intermediate gears 62, therefore, move over the stationary gear 65. For this resetting the disk element 19 will be turned 2½ revolutions which is the difference between 4 turns and the 1½ of the overthrow. By this action, the sockets 22b, 22d and 22f of the disk element 19 are aligned with the inner balls 18.

For this resetting movement of 2½ revolutions of the disk element 19, the described gear connections with the disk element 20, i. e., the gears 62 and teeth 66, will rotate the element 20 one fourth of a revolution more than 2½ turns or a total of 3⅛ revolutions. This aligns the outer sockets 22a, 22c and 22e with the outer balls 18. Since all of the balls at this time are positioned correctly for engagement with their respective sockets, all will simultaneously enter under the action of the spring pressed pressure plate 28. The clutch therefore has placed the drive shaft 11 and the driven shaft 12 into correct driving position.

It should be understood that there is no intermediate position where this setting of the clutch can take place. The sockets 22 of both outer and inner disk elements 20 and 19, being at different distances from the center of the shaft extension 13, require a complete rotation of each element to align their outer and inner sockets with the outer and inner balls. By reason of the gear connections 66, 62 and 65, a simultaneous alignment of both disk sockets and balls can only take place at multiples of five turns for the disk element 20 and four turns for the disk element 19 while the gear 65 is stationary. Such multiple clutch settings will always properly relate the two shafts 11 and 12.

It should be evident upon perusal of the drawings (Figs. 1, 2 and 3) that to provide for other combinations or cycles of operation it is merely necessary to change the ratio of gear drive for the gears 62, 65, 66 through which the machines or parts thereof may operate.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A driving clutch mechanism for machines operating at different cycles in timed relation, comprising a driving member, a driven member, two disk elements carried on one of said members and rotatable together and also relative to each other, clutch elements located adjacent and coactive with each of said disk elements for connecting said driving and said driven members together in normal driving relation, means for exerting pressure on a said element to hold the elements in driving engagement said means yielding under abnormal conditions for disengaging said elements, and means for turning one of said disk elements relative to the other for establishing a proper timed relation between said driving and said driven members.

2. A driving clutch mechanism for machines operating at different cycles in timed relation, comprising a driving member, a driven member, two disk elements carried on one of said members and rotatable together and also relative to each other, clutch elements located adjacent and coactive with each of said disk elements for connecting said driving and said driven members together in normal driving relation, means for exerting pressure on a said element to hold the elements in driving engagement said means yielding under abnormal conditions for disengaging said elements, means for turning one of said disk elements, and a differential unit located between one of said members and said disk elements and operable for turning the other of said disk elements for establishing a proper timed relation between said driving and said driven members.

3. A driving clutch mechanism for machines operating at different cycles in timed relation, comprising a driving member, a driven member, two disk elements carried on one of said members and having slip faces formed with a plurality of spaced countersunk openings, said disk elements being rotatable together and relative to each other, a set of clutch balls located adjacent and coactive with each of said disk faces to engage within said countersunk openings for connecting said driving and said driven members together in normal driving relation, spring means for exerting pressure on said sets of clutch balls to hold the latter in driving engagement with said disk faces said spring means yielding under abnormal conditions for disengaging said sets of clutch balls, and means for turning the said member carrying said disk elements to rotate the same for reengaging said countersunk openings with their respective sets of clutch balls to establish a proper timed relation between said driving and said driven members.

4. A driving clutch mechanism for machines operating at different cycles in timed relation, comprising a driving member, a driven member, clutch instrumentalities located between said driving and said driven members said instrumentalities comprising primary and secondary clutch parts movable in unison for connecting the said members together in normal driving relation, spring means for exerting pressure on said clutch instrumentalities to hold the latter in driving engagement, said spring means yielding under abnormal conditions for disengaging said clutch instrumentalities by movement between said primary clutch parts and said secondary clutch parts, a locking key carried in said driving member for keeping said clutch instrumentalities disengaged following the yielding of said spring means, and means for moving one of said clutch instrumentalities relative to the other for establishing proper timed relation between said driving and said driven members.

5. A driving clutch mechanism for machines operating at different cycles in timed relation, comprising a driving member, a driven member, clutch instrumentalities located between said driving and said driven members said instrumentalities comprising primary and secondary clutch parts movable in unison for connecting the said members together in normal driving relation, a yieldable spring for exerting pressure on said clutch instrumentalities to hold the latter in driving engagement said spring yielding under abnormal conditions for disengaging said clutch instrumentalities by relative movement between said primary and said secondary clutch parts, a plurality of locking keys carried in said driving member for holding said clutch instrumentalities disengaged following the yielding of said spring, and means for moving one of said clutch instrumentalities relative to the other for establishing proper timed relation between said driving and said driven members.

6. A driving clutch mechanism for machines operating at different cycles in timed relation, comprising a driving member, a driven member, clutch instrumentalities comprising primary clutch parts and secondary clutch parts located between said driving and said driven members for connecting the said members together with said primary and secondary clutch parts in normal driving relation, spring means for exerting pressure on said clutch instrumentalities to hold the latter in driving engagement said spring means yielding under abnormal conditions for disengaging said clutch instrumentalities, a plurality of locking keys carried in said driving member for holding said clutch instrumentalities in an inoperative position following the yielding of said spring means, a pressure device also carried in said driving member for engaging each of said locking keys for holding said locking keys in locking position, and means for turning said driven member relative to said driving member for reengaging said clutch instrumentalities with said primary and secondary clutch parts in a definite relation for establishing proper timed relation between said driving and said driven members.

7. A driving clutch mechanism for machines operating at different cycles in timed relation, comprising a driving member, a driven member, clutch instrumentalities comprising primary clutch parts and secondary clutch parts located between said driving and said driven members for connecting the said members together with said primary and secondary clutch parts in normal driving relation, a yieldable spring for exerting pressure on said clutch instrumentalities to hold the latter in driving engagement said spring yielding under abnormal conditions for nullifying the pressure on said clutch instrumentalities, a plurality of locking keys carried in said driving member for holding said clutch instrumentalities in an inoperative position following the yielding of said spring, means carried in said driving member for releasing said locking keys and for holding them in released position for restoring the effectiveness of said yielding spring, and means for turning said driven member relative to said driving member for reengaging said clutch instrumentalities with said primary and secondary clutch parts in a definte relation for establishing proper timed relation between said driving and said driven members.

8. A driving clutch mechanism for machines operating at different cycles in timed relation, comprising a drive shaft and a driven shaft interconnected through the clutch mechanism, a gear carried on the inner end of said drive shaft, a driving member mounted on said shaft, a driven member mounted on said driven shaft, said driven member including a hub having disk elements carried thereon, clutch elements located adjacent and coactive with each of said disk elements for connecting said driving and said driven members together in normal driving relation, a yieldable spring for exerting pressure on said clutch elements to hold the latter in driving engagement with said disk elements said spring yielding under abnormal conditions for disengaging said clutch elements, a plurality of locking keys carried in said driving member for holding said clutch elements in an inoperative position following the yielding of said spring, a key release ring movably carried in said driving member and having a plurality of cam walls for engagement with said locking keys for withdrawing said keys from locked position, intermediate gears carried in said hub and meshing with said drive shaft gear and with teeth formed in a said disk element for rotating said disk elements relative to each other for reengaging the latter with their respective clutch elements, and means for turning said driven member and reengaging said clutch elements to establish proper timed relation between said drive and said driven shafts.

9. A driving clutch mechanism for machines operating at different cycles in timed relation, comprising a driving member, a driven member, clutch instrumentalities located between said driving and said driven members for connecting the said members together in normal driving relation said clutch instrumentalities comprising primary and secondary clutch parts, means for exerting pressure on said clutch instrumentalities to hold the latter in driving engagement said means yielding under abnormal conditions for disengaging said clutch instrumentalities, means for turning said driven member relative to the driving member for establishing proper timed relation between said driving and said driven members when said normal driving relation is disrupted, and a differential unit interposed between said driving and driven members for rotating one clutch instrumentality at a different rate from the other when engaging said primary and said secondary clutch parts.

FELIX HUNTAR.

REFERENCES CITED

The following references are of record in the file of this patent:

UNITED STATES PATENTS

| Number | Name | Date |
| --- | --- | --- |
| 1,879,486 | Rancke | Sept. 27, 1932 |